(12) United States Patent

Moshavi et al.

(10) Patent No.: US 9,872,305 B2
(45) Date of Patent: Jan. 16, 2018

(54) OPTIMIZED CELLULAR TRANSMISSION SCHEDULING BASED ON KNOWLEDGE OF INTERFERENCE-MITIGATION CAPABILITIES IN NEIGHBOR CELL

(71) Applicant: Marvell International Ltd., Hamilton (BM)

(72) Inventors: Shimon Moshavi, Bet Shemesh (IL); Ezer Melzer, Tel Aviv (IL); Yona Perets, Ra'anana (IL)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/981,985

(22) Filed: Dec. 29, 2015

(65) Prior Publication Data

US 2016/0198486 A1    Jul. 7, 2016

Related U.S. Application Data

(60) Provisional application No. 62/100,390, filed on Jan. 6, 2015.

(51) Int. Cl.
*H04W 72/12* (2009.01)
*H04J 11/00* (2006.01)
*H04B 7/024* (2017.01)

(52) U.S. Cl.
CPC ......... *H04W 72/12* (2013.01); *H04J 11/0053* (2013.01); *H04B 7/024* (2013.01)

(58) Field of Classification Search
CPC ............. H04W 72/082; H04W 52/244; H04W 52/243; H04W 84/045; H04W 72/1226; H04W 28/08; H04W 72/0426; H04W 24/02; H04W 72/10; H04W 52/242; H04W 52/325; H04W 52/343; H04W 36/20; H04W 28/0236; H04W 36/0094; H04W 52/0238; H04W 52/241; H04L 5/006; H04L 5/0032; H04B 7/0452; H04B 2201/70702; H04J 11/005; H04J 11/0023; H04J 13/18

See application file for complete search history.

(56) References Cited

U.S. PATENT DOCUMENTS

| | | | | |
|---|---|---|---|---|
| 2009/0017783 | A1* | 1/2009 | Li | H04W 52/325 455/296 |
| 2009/0017850 | A1* | 1/2009 | Jovicic | H04W 52/34 455/501 |
| 2009/0197590 | A1* | 8/2009 | Borran | H04W 52/242 455/423 |
| 2013/0114496 | A1* | 5/2013 | Mazzarese | H04L 5/0023 370/312 |
| 2014/0256336 | A1* | 9/2014 | Manssour | H04L 1/0026 455/450 |
| 2015/0304063 | A1* | 10/2015 | Zhu | H04W 72/12 370/329 |
| 2016/0099791 | A1* | 4/2016 | Cui | H04J 11/0053 370/329 |

* cited by examiner

*Primary Examiner* — Nizar Sivji (57) ABSTRACT

A method includes identifying interference mitigation capabilities of a first communication unit in a first cell of a cellular communication network. Transmissions of a second communication unit in a second cell of the cellular communication network are scheduled based on the identified interference mitigation capabilities of the first communication unit in the first cell.

20 Claims, 3 Drawing Sheets

OPTIMIZED CELLULAR TRANSMISSION SCHEDULING BASED ON KNOWLEDGE OF INTERFERENCE-MITIGATION CAPABILITIES IN NEIGHBOR CELL

CROSS-REFERENCE TO RELATED APPLICATIONS

This application claims the benefit of U.S. Provisional Patent Application 62/100,390, filed Jan. 6, 2015, whose disclosure is incorporated herein by reference.

FIELD OF THE DISCLOSURE

The present disclosure relates generally to communication systems, and particularly to methods and systems for scheduling of cellular transmissions in one cell based on knowledge of interference-mitigation capabilities in a neighbor cell.

BACKGROUND

Cellular communication networks cover a certain geographical area using relatively small coverage regions called cells. Each cell is served by at least one fixed-location transceiver, referred to as a cell site or base station (BS). Since the spectrum available for the network is limited, frequencies are typically reused among multiple cells. Inter-cell interference may occur when transmissions in neighboring cells are scheduled simultaneously on the same or nearby frequencies.

Various methods for mitigating inter-cell interference are known in the art. For example, various 3GPP Long-Term Evolution (LTE) standards specify interference cancellation schemes such as Interference Rejection Combining (IRC), Network Assisted Interference Cancellation and Suppression (NAICS) and Coordinated Multipoint (CoMP).

The description above is presented as a general overview of related art in this field and should not be construed as an admission that any of the information it contains constitutes prior art against the present patent application.

SUMMARY

An embodiment that is described herein provides a method that includes identifying interference mitigation capabilities of a first communication unit in a first cell of a cellular communication network. Transmissions of a second communication unit in a second cell of the cellular communication network are scheduled based on the identified interference mitigation capabilities of the first communication unit in the first cell.

In some embodiments, identifying the interference mitigation capabilities includes identifying interference cancellation capabilities of a user terminal in the first cell, and scheduling the transmissions includes scheduling downlink transmissions of a base station that serves the second cell based at least in part on the interference cancellation capabilities of the user terminal in the first cell. In other embodiments, identifying the interference mitigation capabilities includes identifying interference cancellation capabilities of a base station that serves the first cell, and scheduling the transmissions includes scheduling uplink transmissions of a user terminal in the second cell based at least in part on the interference cancellation capabilities of the base station that serves the first cell. In yet other embodiments, identifying the interference mitigation capabilities includes identifying directional transmission capabilities of a user terminal in the first cell, and scheduling the transmissions includes scheduling uplink transmissions of a user terminal in the second cell based at least in part on the directional transmission capabilities of the user terminal in the first cell.

In an embodiment, identifying the interference mitigation capabilities includes receiving a notification indicating the interference mitigation capabilities by direct communication between first and second base stations that serve the first and second cells, respectively. In another embodiment, identifying the interference mitigation capabilities includes identifying interference cancellation capabilities of a user terminal in the first cell, and scheduling the transmissions includes scheduling sidelink transmissions of a user terminal in the second cell that communicates peer-to-peer with another user terminal based at least in part on the interference cancellation capabilities of the user terminal in the first cell.

In yet another embodiment, identifying the interference mitigation capabilities includes identifying that the first communication unit supports interference mitigation, and scheduling the transmissions includes scheduling the transmissions of the second communication unit independently of scheduling transmissions of the first communication unit.

In some embodiments, identifying the interference mitigation capabilities includes identifying a number of multiple-input multiple-output (MIMO) layers supported by a user terminal in the first cell, and inferring a number of receiving antennas of the user terminal based on the number of MIMO layers supported. In other embodiments, identifying the interference mitigation capabilities includes detecting a user terminal, which is served by the first cell and is likely to suffer from interference caused by a base station that serves the second cell, and identifying the interference mitigation capabilities of the detected user terminal. In yet another embodiment, detecting the user terminal includes receiving channel state information (CSI) from the user terminal including channel quality expected under interference caused by downlink transmissions in neighbor cells, and detecting the user terminal based on the CSI.

In some embodiments, detecting the user terminal includes accepting first power measurements of downlink transmissions of a base station serving the user terminal in the first cell, further accepting second power measurements of interfering downlink transmissions in neighbor cells and received by the user terminal, and detecting the user terminal based on the first and second power measurements. In other embodiments, detecting the user terminal includes conducting in the base station first power measurements of uplink transmissions of one or more user terminals served by the base station, further conducting in the base station second power measurements of uplink transmissions of the user terminal, and detecting the user terminal based on the first and second power measurements. In yet other embodiments, scheduling the transmissions includes setting at least one transmission attribute selected from a list consisting of a time interval used for transmission, a frequency allocated for transmission, and a spatial pattern of the transmission gain.

There is additionally provided, in accordance with an embodiment that is described herein, an apparatus including first and second base stations, and a processor. The first and second base stations are configured to serve respective first and second cells of a cellular communication network. The processor is configured to identify interference mitigation capabilities of a first communication unit in the first cell, and to schedule transmissions of a second communication unit in the second cell of the cellular communication network based on the identified interference mitigation capabilities of the first communication unit in the first cell.

The present disclosure will be more fully understood from the following detailed description of the embodiments thereof, taken together with the drawings in which:

DETAILED DESCRIPTION OF EMBODIMENTS

In cellular communication systems, time/frequency and other resources required for communication are typically allocated and scheduled by the network. Transmissions in neighboring cells may interfere with one another, e.g., when simultaneously sharing the same or nearby frequency resources. Interference in one cell caused by transmissions in another cell is referred to as inter-cell interference.

For example, in one interference scenario, the receiver of a mobile terminal in one cell may suffer interference caused by downlink transmissions of base stations in neighbor cells. In another scenario, a base station receiver may suffer interference caused by uplink transmissions of mobile terminals served by other base stations in neighbor cells.

To avoid inter-cell interference, the network could, in principle, assign frequency resources to cells so that frequencies are reused only among non-neighboring cells. This approach, however, limits the achievable network capacity considerably. Conventional blind and network-assisted methods such as IRC, NAICS and CoMP, cited above, provide some level of mitigation of inter-cell interference.

Embodiments that are described herein provide improved methods and systems for scheduling transmissions in one cell based on identified interference mitigation capabilities in neighbor cells. In the disclosed techniques, interference mitigation capabilities of base stations and/or mobile terminals in a given cell are reported to a neighbor cell. Based on these reported capabilities, the neighbor cell schedules its transmissions so as to avoid or reduce inter-cell interference. In some embodiments, for achieving low latency, the base stations of the two cells exchange information regarding interference mitigation capabilities with one another over a direct link that operates, for example, in accordance with the X2 communication protocol or other suitable protocol exchanging information over a direct link between cells in a network.

In the context of the present disclosure and in the claims, the term "interference mitigation capabilities" refers to the techniques that a mobile terminal or BS supports and can apply to cancel or suppress interference. Some interference mitigation capabilities are applied on reception, and other capabilities are applied on transmission.

In the description that follows, the terms "mobile terminal", "mobile device", and "user terminal" are used interchangeably. In addition, the term "terminal" may also be used, for brevity.

In the context of the present disclosure and in the claims, the term "scheduling" refers to setting transmission attributes to be used. Examples of such transmission attributes include the time interval selected for the transmission, the frequency or frequency band allocated for the transmission, and spatial pattern of the transmission gain.

In some embodiments, scheduling downlink transmissions of a base station serving a given cell is based on knowledge of the interference cancellation capabilities of a user terminal in a neighbor cell. In other embodiments, scheduling uplink transmissions of a user terminal in a given cell is based on knowledge of the interference cancellation capabilities of a base station serving a neighbor cell. In yet other embodiments, scheduling uplink transmissions of a user terminal in a given cell is based on identified directional transmission capabilities of a user terminal in a neighbor cell. In yet further other embodiments, the uplink transmissions of a user terminal served in a given cell that communicates peer-to-peer with another user terminal are scheduled based on identified interference cancellation capabilities of a user terminal or a base station in a neighbor cell. In yet further embodiments scheduling downlink transmissions of a base station in a given cell is based on identified directional transmission capabilities of a base station serving a neighbor cell.

The interference mitigation capabilities of a user terminal include, for example, an indication of whether or not the terminal supports an interference cancellation technique such as IRC, NAICS or CoMP. Alternatively or additionally, the interference cancellation capabilities of a user terminal or a BS include the number of receiving and/or transmitting antennas, since multiple antennas can be used for directional reception and/or transmission using beamforming techniques. Typically, a larger number of receiving and/or transmitting antennas results in better directional reception and/or transmission capabilities, respectively. In some embodiments, the number of receiving antennas is inferred indirectly, based on the number of multiple-input multiple-output (MIMO) layers supported.

In some embodiments, when a first terminal in a first cell supports at least one interference mitigation technique, allocation of time/frequency resources to downlink transmission in a second cell does not have to take into consideration the time/frequency resources used for downlink transmissions to the first terminal in the first cell. As another example, directional downlink transmissions in the second cell may be applied without having to place a spatial null in the direction of the first terminal.

In some embodiments, the network detects which of the terminals in the first cell is likely to suffer from interference from downlink transmissions in the second cell. In one embodiment, detecting such a terminal is based on channel state information (CSI) reported by the terminals in the first cell. In another embodiment, the detection is based on power measurements of intended and interfering downlink transmissions, as measured and reported by terminals in the first cell. In yet another embodiment, the detection is based on power measurements that the base station in the second cell performs on uplink transmissions of its served user terminals and to uplink transmissions of the user terminal in the first cell.

In the disclosed techniques, interference mitigation capabilities of communication units in one cell are reported to a neighbor cell, which schedules its uplink and/or downlink transmissions to reduce the likelihood of inter-cell interference. As a result, the network utilizes communication resources more efficiently, which improves the network capacity and performance.

Figure 1:
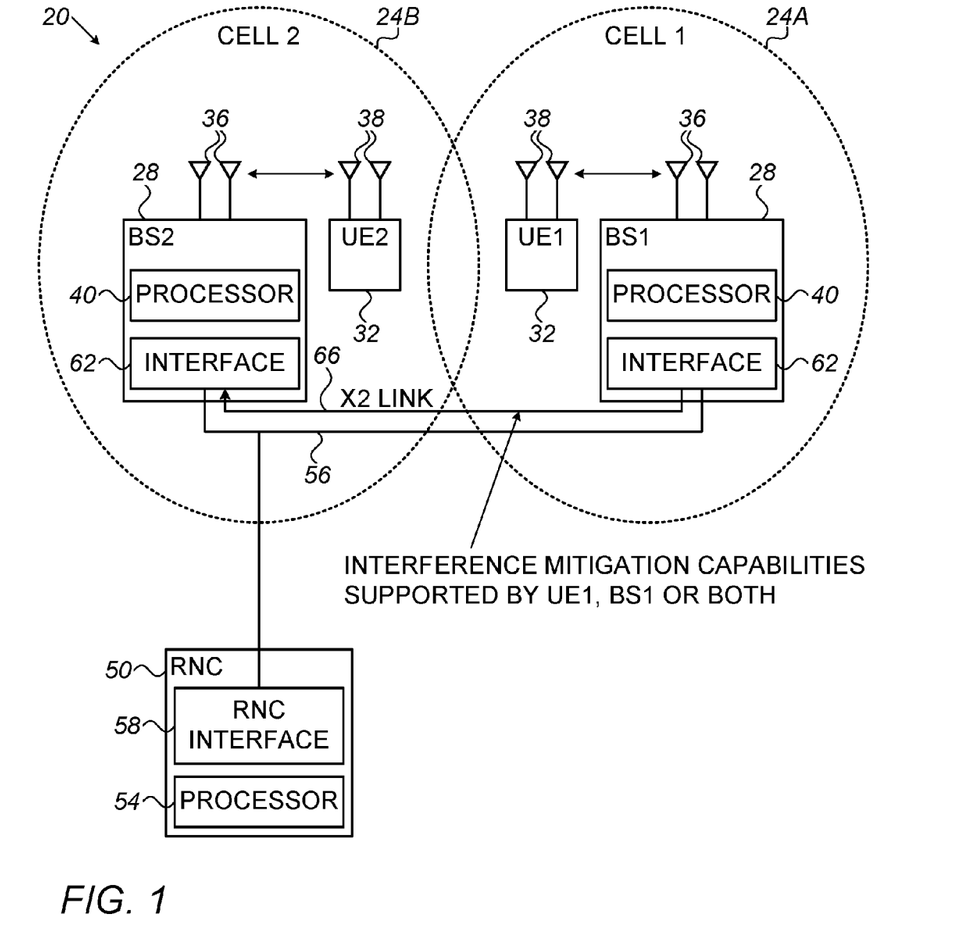
FIG. 1 is a block diagram that schematically illustrates a cellular communication network, in accordance with an embodiment that is described herein.

FIG. 1 is a block diagram that schematically illustrates a cellular communication network 20, in accordance with an embodiment that is described herein. Network 20 comprises neighbor cells 24A and 24B, which are served by respective base stations (BS) 28. In the present example, cell 24A denoted CELL1 is served by base station 28 denoted BS1, and cell 24B denoted CELL2 is served by base station 28 denoted BS2.

In the present example, network 20 operates in accordance with the Long Term Evolution (LTE) specifications. In alternative embodiments, network 20 operates in accordance with any other suitable communication standard or protocol that supports mobile terminals and/or base stations having interference mitigation capabilities.

BS1 and BS2 communicate with one or more mobile terminals 32 located within the coverage area of their respective cells. In LTE, a mobile terminal is also referred to as an E-UTRA User Equipment (UE) or simply UE for brevity, and a BS is also referred to as an eNodeB. In the present example, mobile terminals 32 denoted UE1 in CELL1 and UE2 in CELL2 are served by BS1 and BS2, respectively.

BS 28 (e.g., BS1 and BS2) comprises one or more antennas 36 for transmitting downlink signals to and receiving uplink signals from the UEs served by the BS. UE 32 (e.g., UE1 and UE2) comprises one or more antennas 38 for transmitting uplink signals and receiving downlink signals from its serving BS. In addition to targeted transmissions, a UE or BS in one cell may undesirably receive interfering transmissions of BSs or UEs in other cells. BS 28 comprises a processor 40 that carries out the various tasks of the BS, such as, for example, handling tasks required for operating the BS transceiver, scheduling downlink transmissions, and the like.

Using multiple transmit and/or receive antennas, enables a BS or UE to apply beamforming techniques to achieve directional transmission and/or reception. For example, in some embodiments, a UE or BS directs the transmitted power toward a target receiver and suppresses or nulls the transmitted power in directions in which the transmission interferes with other transmissions. Alternatively or additionally, a BS or UE applies directional reception, e.g., emphasizes the reception in the direction of a desired signal and/or places a reception null in the direction of an interfering signal.

Network 20 comprises a radio network controller (RNC) that controls the operation of base stations BS1 and BS2. RNC 50 manages radio resources to efficiently utilize the limited radio-frequency spectrum, by controlling parameters such as transmit power, user allocation, beamforming, data rates and the like. A processor 54 carries out the various tasks of RNC 50. RNC 50 communicates user data and signaling with BS1 and BS2 over a communication link 56 via RNC interface 58 at the RNC side and interface 62 at the BS side.

A communication channel established between a UE and its serving BS requires dedicated time and frequency resources. In LTE, time/frequency resources are scheduled in a time-frequency plane comprising time frames and frequency bands in the time and frequency domains, respectively. In some embodiments, RNC 50 schedules time/frequency and other resources for base stations BS1 and BS2 and to mobile terminals UE1 and UE2. In other embodiments, each BS carries out the scheduling within the cell it serves, independently. In yet other embodiments, scheduling is carried out jointly by the RNC and BSs. In the context of the present disclosure and in the claims, the term "scheduling" refers to scheduling any resources required for communication such as time/frequency resources as well as resources required for beamforming.

In network 20, various interference scenarios are possible. Consider for example a scenario in which UE1 is located relatively close to its serving base station BS1, whereas UE2 is located far away from its serving base station BS2, e.g., near the edge of CELL2. In such a case, the downlink/uplink channels between BS2 and UE2 require transmission at much higher power than the downlink/uplink channels between BS1 and UE1, to achieve similar channel quality. As a result, UE1 receives desired downlink transmissions from BS1 and interfering downlink transmissions from BS2 targeted, for example, to UE2. Similarly, since the uplink channel between UE2 and BS2 requires higher transmission power than the uplink channel between UE1 and BS1, BS1 receives interfering uplink transmissions from UE2 targeted toward BS2, in addition to the desired uplink transmissions from UE1.

In the disclosed techniques, the transmissions in one cell are scheduled based on interference mitigation capabilities supported in a neighbor cell. A UE served by network 20, such as UE1, may have no interference mitigation capabilities, for example, when the UE in question is a low-cost or older generation device. Alternatively, the UE may support at least one interference mitigation technique such as IRC, NAICS or CoMP, described above. In some embodiments, the UE reports the interference mitigation capabilities the UE supports to its serving BS. Example interference mitigation capabilities that a UE may support include one or more of:

Whether or not the UE supports the NAICS technique.
Whether or not the UE supports IRC.
Whether or not the UE supports multiuser multiple-input multiple-output (MU-MIMO).
The number of MIMO layers (spatial streams) the UE receiver supports.
The number of receiving antennas.
The number of transmitting antennas.

In the present example, UE1 reports its interference mitigation capabilities to BS1, which sends this information to BS2 via a direct X2 link 66, in an embodiment. In an embodiment, BS1 additionally sends to BS2 information regarding its own interference mitigation capabilities, e.g., via X2 link 66. BS2 uses knowledge of the interference mitigation capabilities of UE1, BS1 or both to schedule downlink transmissions of BS2 and/or uplink transmission of UE2 in CELL2.

In some network configurations, UEs such as UE1 report their capabilities to their respective serving BSs, including interference cancellation capabilities. In an embodiment, such network configurations require no extra uplink bandwidth for reporting the UE interference mitigation capabilities, as described above.

In some cellular networks such as network 20, the base stations communicate with one another via a direct X2 link such as link 66, for various purposes. Since the amount of information required for reporting the interference mitigation capabilities is relatively small, in some embodiments, the interference mitigation capabilities information is sent over existing X2 links that may also carry other traffic.

Typically, processor 40 of BS 28 and processor 54 of RNC 50 each comprise a processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In the context of the present disclosure and in the claims, the term "processor" refers collectively to processor 54 of RNC 50 and processors 40 of BS1 and BS2. In other words, a task carried out by this processor can be carried out by each of processors 54 or 40 separately, or alternatively, in any suitable processor combination.

The network configuration in FIG. 1 is given by way of example, and other suitable network configurations can also be used. Although network 20 comprises only two cells, and only one mobile terminal is served by a single BS in each cell, the disclosed techniques are equally applicable to large scale networks having more than two cells, in which multiple mobile terminals are served by respective one or more base stations.

In the example of FIG. 1, RNC 50 controls base stations BS1 and BS2. In alternative embodiments, network 20 may comprises multiple RNCs such as RNC 50, each controlling multiple BSs such as BS 28. Further alternatively, a management module other than RNC 50 can be used for controlling the BSs, in an embodiment.

Next we describe several methods for scheduling transmissions in one cell based on interference mitigation capabilities in a neighbor cell, with reference to network 20 of FIG. 1.

Figure 2:
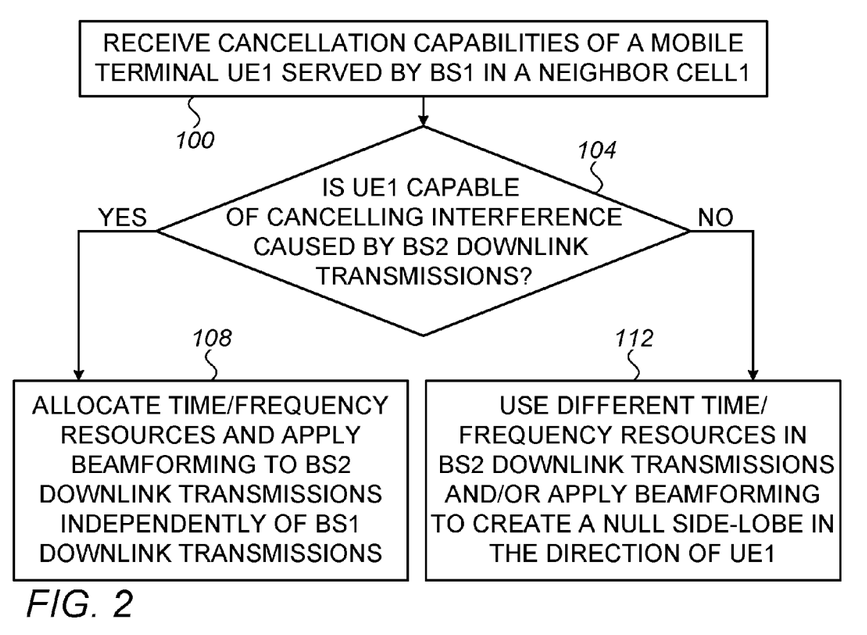
FIG. 2 is a flow chart that schematically illustrates a method for scheduling transmissions of a base station (BS) in a cell, based on interference cancellation capabilities of a mobile terminal served in a neighbor cell, in accordance with an embodiment that is described herein.

FIG. 2 is a flow chart that schematically illustrates a method for scheduling transmissions of a base station 28 (BS) in a cell, based on interference cancellation capabilities of a mobile terminal 32 served in a neighbor cell, in accordance with an embodiment that is described herein. In the present scenario, downlink transmissions from BS2 to UE2 may interfere with BS1 downlink transmissions received by UE1.

The method begins with the processor (e.g., processor 40 of BS2) receiving information regarding the interference cancellation capabilities of the receiver part of UE1, at a capabilities reception operation 100. In an embodiment, at operation 100 BS2 receives from BS1 interference cancellation capabilities previously reported by UE1 to BS1.

Some interference cancellation capabilities such as an indication of whether or not UE1 supports a given interference cancellation technique, e.g., NAICS or IRC, are reported in a direct manner. Other interference cancellation capabilities may be inferred indirectly as described herein.

For example, in an embodiment, UE1 reports to BS1 the number of MIMO layers that UE1 supports, and the processor infers hinting information regarding the number of receiving antennas of UE1. In an example embodiment, the inferred number of receiving antennas is equal to or greater than the number of MIMO layers supported. In another embodiment, UE1 operates in accordance with category 0 defined in the 3GPP LTE specifications, which indicates that UE1 has a single receiving antenna, and therefore has no directional reception capabilities. Alternatively, UE1 operates in accordance with higher categories, which indicate that UE1 has at least two receiving antennas.

At a capabilities analysis operation 104, the processor checks, based on the capabilities received at operation 100, whether UE1 is capable of cancelling interference caused by BS2 downlink transmissions.

In some embodiments, e.g., when UE1 supports NAICS, the processor additionally receives, e.g., at operation 100 or 104, a message from BS1 or RNC that indicates whether or not the network is configured to assist UE1 with canceling interfering downlink signals destined to mobile terminals served by BS2. The processor uses this additional knowledge for scheduling the BS2 downlink transmissions.

In some embodiments, when the processor discovers, at operation 104, that UE1 supports NAICS, the processor proceeds to a reusing operation 108, in which BS2 allocates time/frequency resources to its downlink transmissions without having to take into consideration the time/frequency resources allocated to the BS1 downlink transmissions destined to UE1. This scheduling strategy is based on the assumption that UE1 is able to successfully cancel or suppress interference caused, for example, by BS2 downlink transmissions.

Additionally, at operation 108, the processor applies beamforming techniques on the downstream transmissions of BS2 without having to take into consideration the downlink transmissions of BS1 to UE1. In an embodiment, since BS2 relies on the ability of UE1 to cancel interference, BS2 chooses not to apply any beamforming to the BS2 downlink transmissions. Alternatively, BS2 applies beamforming to its downlink transmissions without placing a transmission null in the direction of UE1.

In yet other embodiments, at operation 108, the processor applies beamforming to the BS2 downlink transmissions to enhance the transmission power in the direction of UE1. This strategy may assist UE1 with estimating the interfering signal with higher accuracy and therefore achieve improved interference cancellation.

When at operation 104, the processor discovers that UE1 is unable to cancel or suppress interference, or that UE1 has only poor interference cancellation capabilities, the processor proceeds to an interference mitigation operation 112. At operation 112 the processor schedules to the downlink transmissions of BS2 time/frequency resources different from those used for the BS1 to UE1 downlink channel, to avoid interference. Alternatively or additionally, at operation 112, the processor applies beamforming to place a null in the downlink transmissions of BS2 in the direction of UE1.

In some embodiments, at operation 104, the processor discovers that the receiver of UE1 supports IRC. In such cases, the processor proceeds to operation 108 similarly to the case in which UE1 supports NAICS, as described above.

A larger number of receiving antennas typically enables a UE to suppress directional interference more efficiently, e.g., by applying appropriate per-antenna weights to place a reception null in the interference direction. In some embodiments, the processor is aware of the number of receiving antennas in UE1, or as described above, the processor is aware at least of a minimal number of receiving antennas that UE1 may have. In such embodiments, the processor uses the number of receiving antennas in UE1 to assess the capabilities of UE1 to cancel or suppress interference, e.g., at operation 104.

In some embodiments, the BS2 downlink transmissions comprise multiple MIMO layers. Since the interfering effect of the multiple layers accumulates, UE1 may fail to cancel multi-layer interference using techniques such as NAICS. In accordance with the 3GPP specifications, for example, a UE that supports NAICS is required to cancel only a limited number of MIMO layers. Therefore, in some embodiments, at operation 108, the processor schedules the BS2 downlink transmission to include a limited number of MIMO layers so as to meet the cancellation capabilities of UE1. Following operation 108 or 112 the method terminates.

Figure 3:
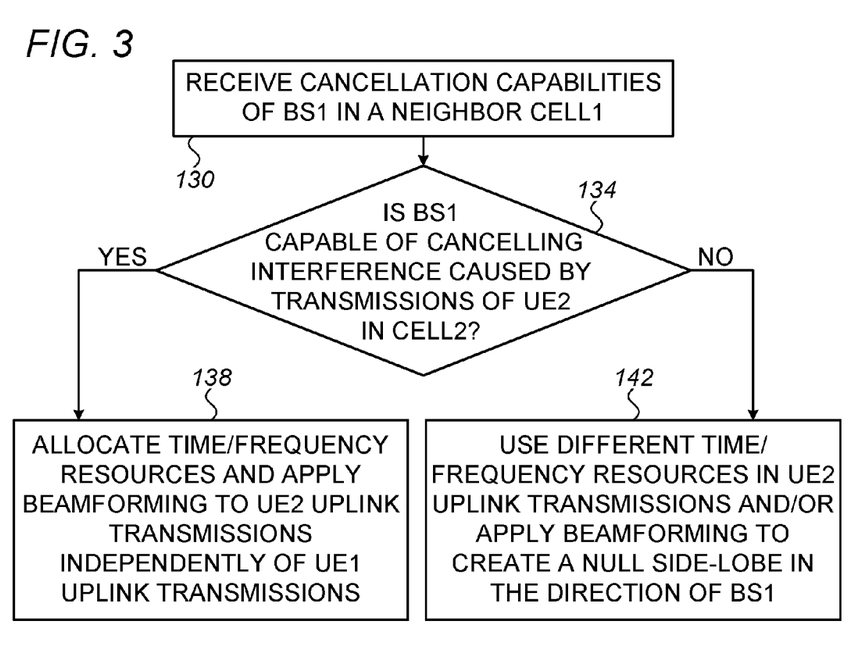
FIG. 3 is a flow chart that schematically illustrates a method for scheduling transmissions of a mobile terminal in a cell, based on interference cancellation capabilities of a BS serving mobile terminals in a neighbor cell, in accordance with an embodiment that is described herein.

FIG. 3 is a flow chart that schematically illustrates a method for scheduling transmissions of a mobile terminal in a cell, based on interference cancellation capabilities of a BS serving mobile terminals in a neighbor cell, in accordance with an embodiment that is described herein.

The method begins with the processor (e.g., processor 40 of BS2) receiving interference cancellation capabilities of BS1 in a neighbor CELL1, at a capabilities reception operation 130. Such capabilities may comprise methods for interference cancellation and/or suppression that the receiver part of BS1 may apply as appropriate. Alternatively or additionally, the capabilities may include the number of receiving antennas used by the BS1 receiver—a larger number typically indicates of improved interference cancellation and/or suppression capabilities.

At a capability analysis operation 134, the processor analyses the BS1 capabilities received at operation 130 and checks whether or not BS1 is capable of cancelling interference caused by UE2 uplink transmissions in CELL2. When BS1 supports interference cancellation, BS1 can successfully mitigate interference caused by UE2, and the processor proceeds to a reusing operation 138, in which the processor allocates to the uplink transmissions of UE2 time/frequency resources independently of or without having to take into consideration the time/frequency resources allocated to the uplink transmissions of UE1 in CELL1.

In some embodiments, UE2 comprises multiple transmitting antennas, and BS2 controls the way in which UE2 applies beamforming to its uplink transmissions. In such embodiments, the processor may control the directional transmissions that UE2 applies independently of the downlink transmissions of BS1. More specifically, the processor may control UE2 not to apply any beamforming, or to apply beamforming without placing a transmission null in the direction of BS1.

When at operation 134 the processor discovers that BS1 has no interference cancellation capabilities, or that such capabilities of BS1 are poor, the processor proceeds to an interference mitigation operation 142, in which the processor allocates to the UE2 uplink transmissions time/frequency resources different from those allocated to the uplink transmissions of UE1. Alternatively or additionally, the processor controls UE2 to apply beamforming with a transmission null in the direction of BS1. Following operation 138 or 142 the method terminates.

Some cellular communication networks support direct peer-to-peer communications between mobile terminals. For example, the 3GPP LTE specifications describe a feature called Device-to-Device (D2D) communication over a channel referred to as a "sidelink." A D2D sidelink does not use the cellular network infrastructure, but enables LTE based devices to communicate directly with one another when they are in close proximity. Peer-to-peer communication typically utilizes uplink time/frequency resources.

Consider, for example, a scenario in which UE2 communicates over a D2D link with another UE (not shown) in CELL2 using time/frequency uplink resources. This D2D link may cause interference to BS1 and/or to at least one of terminals UE1A and UE1B (not shown) that communicate with one another over a D2D link in CELL1. In some embodiments, scheduling the D2D transmissions in CELL2 is based on the interference cancellation capabilities of BS1 in CELL1. In other embodiments, scheduling the D2D transmissions in CELL2 is based on the interference cancellation capabilities of UE1A, UE1B or both in CELL1.

Figure 4:
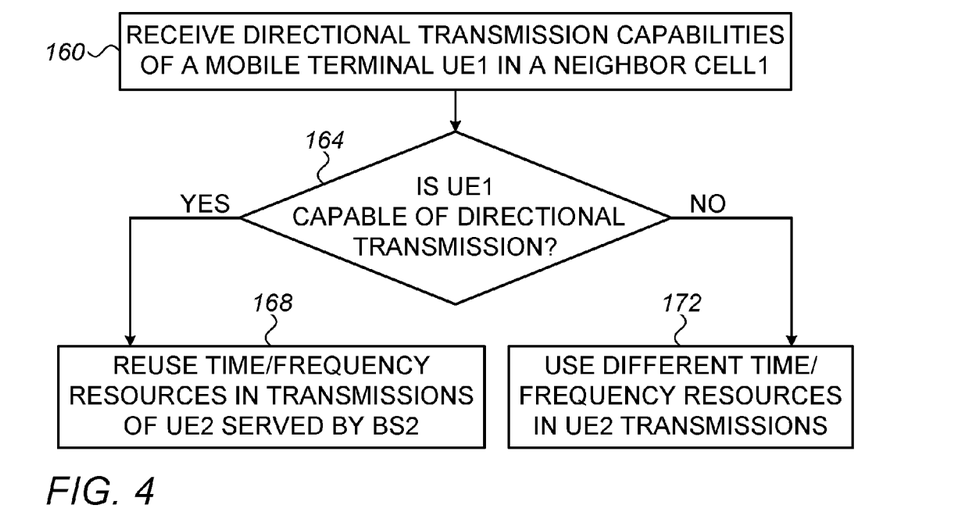
FIG. 4 is a flow chart that schematically illustrates a method for scheduling transmissions of a mobile terminal, based on directional transmission capabilities of a mobile terminal served in a neighbor cell, in accordance with an embodiment that is described herein.

FIG. 4 is a flow chart that schematically illustrates a method for scheduling transmissions of a mobile terminal, based on directional transmission capabilities of a mobile terminal served in a neighbor cell, in accordance with an embodiment that is described herein.

The method begins with the processor receiving directional transmission capabilities of UE1, at a capabilities reception operation 160. In the present setup, the UE1 uplink transmissions toward BS1 are also received by BS2 and may interfere with BS2 reception of the uplink transmissions of UE2. At a capabilities analysis operation 164, the processor checks whether UE1 is capable of directional transmission.

If UE1 supports directional transmission, it is assumed that UE1 will apply beamforming to place a transmission null in the direction of BS2, and the processor proceeds to a reusing operation 168 in which the processor allocates time/frequency resources to the UE2 uplink transmissions independently of the time/frequency resources allocated to the uplink transmissions of UE1.

If at operation 164 the processor discovers that UE1 does not support directional transmission, or that UE1 has poor directional transmission capabilities, the processor proceeds to an interference mitigation operation 172 in which the processor allocates to the uplink transmissions of UE2 time/frequency resources different from those allocated to the uplink transmissions of UE1. Following operation 168 or 172, the method terminates.

Figure 5:
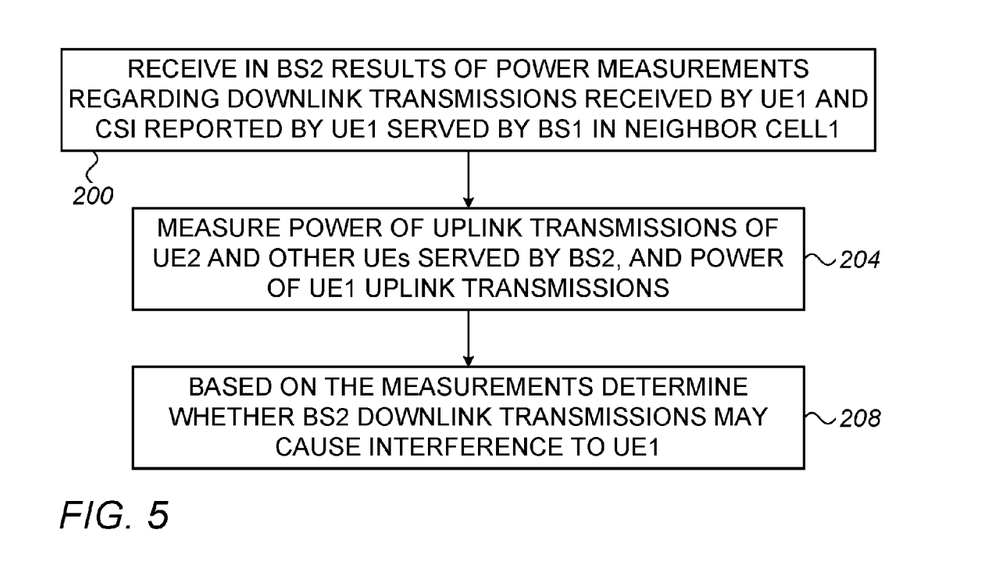
FIG. 5 is a flow chart that schematically illustrates a method for identifying a mobile terminal in a cell that may suffer interference from downlink transmissions in a neighbor cell.

FIG. 5 is a flow chart that schematically illustrates a method for identifying a mobile terminal in a cell that may suffer interference from downlink transmissions in a neighbor cell. The method begins with the processor (e.g., processor 40 of BS2) receiving downlink power measurements, at a downlink measurement operation 200. The power measurements refer to downlink transmissions from BS1 to UE1 and interfering downlink transmissions from BS2 that are received by UE1. In some embodiments, based on the ratio between the power of the desired BS1-UE1 downlink transmissions and the power of the interfering BS2 downlink transmissions, the processor estimates the likelihood that UE1 in CELL1 may suffer interference from the BS2 downlink transmissions in CELL2.

In some network configurations, a UE reports to the network channel state information (CSI) regarding the quality of the channel between the UE and its serving BS. In 3GPP, some enhanced CSI configurations include reporting the signal to noise ratio (SNR) expected under interference caused by downlink transmissions in neighbor cells. When the expected SNR is low, this may indicate that UE1 is likely to suffer interference from the BS2 downlink transmissions. BS2 receives the CSI report including the SNR under expected interference, and uses this information to assess the likelihood that UE1 is subject to interference.

At an uplink measurement operation 204, the processor measures the power of uplink transmissions of UE2 and possibly other UEs in CELL2, and the power of the uplink transmissions of UE1 in CELL1 that are received by BS2. High-power uplink transmissions by UE2 (or by other UEs served by BS2) may indicate that the respective downlink transmissions from BS2 to UE2 are also high-power and therefore may cause interference to UE1 in neighbor CELL1. Note that in time division duplex (TDD) systems in which frequency is reused for uplink and downlink channels, this method is expected to perform better than in frequency division duplex (FDD) systems.

In cellular communication systems, the network is typically aware of the location of the mobile terminals. In an embodiment, the location of UE1 (and possibly the location of other UEs served in CELL1) is reported to BS2. The processor uses the location information to decide whether the downlink transmissions of BS2 may interfere with the downlink transmission of BS1 received by UE1.

At a victim identification operation 208, the processor uses one or more of the information sources reported at operations 200 and 204 to decide whether or not UE1 is likely to suffer interference from the downlink transmissions of BS2. Following operation 208 the method terminates.

Although the method of FIG. 5 mainly refers to a mobile terminal victim, similar methods can be used to identify base stations that may suffer from interference caused by uplink transmissions in a neighbor cell.

The methods described in FIGS. 2-5 are given by way of example and in other embodiments other suitable methods can also be used. For example, in describing the methods above, we mainly consider interference caused by a single BS or UE. This limitation, however, is not mandatory, and the disclosed methods are applicable to multi-interferer scenarios, as well.

Although the embodiments described herein mainly address LTE networks, the methods and systems described herein can also be used in other applications, such as interference mitigation in cellular communication systems in general.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a cellular communication network that comprises a first base station serving a first user terminal and a second base station serving a second user terminal, identifying, by the first base station, (i) capabilities of the first base station to reduce interference caused to the first base station by transmissions of the second base station or by transmissions of the second user terminal, or (ii) capabilities of the first user terminal to reduce interference caused to the first user terminal by transmissions of the second base station or by transmissions of the second user terminal;
reporting by the first base station, to the second base station, the capabilities to reduce the interference, which were identified by the first base station; and
based on the reported capabilities of the first base station or of the first user terminal to reduce the interference, scheduling, by the second base station, transmissions (i) of the second user terminal to the second base station, or (ii) of the second base station to the second user terminal,
wherein scheduling the transmissions comprises checking, based on the reported capabilities, whether or not the first user terminal is capable of directional transmission,
wherein if the checking indicates that the first user terminal is capable of directional transmission, reusing time/frequency resources that are allocated for uplink transmissions of the first user terminal in uplink transmissions of the second user terminal, and if the checking indicates that the first user terminal is incapable of directional transmission, refraining from reusing time/frequency resources that are allocated for uplink transmissions of the first user terminal in uplink transmissions of the second user terminal.

2. The method according to claim 1, wherein identifying the capabilities of the first user terminal to reduce interference comprises identifying interference cancellation capabilities of the first user terminal, and wherein scheduling the transmissions comprises scheduling downlink transmissions of the second base station to the second user terminal based at least in part on the interference cancellation capabilities of the first user terminal.

3. The method according to claim 1, wherein identifying the capabilities of the first base station to reduce interference comprises identifying interference cancellation capabilities of the first base station, and wherein scheduling the transmissions comprises scheduling uplink transmissions of the second user terminal based at least in part on the interference cancellation capabilities of the first base station.

4. The method according to claim 1, wherein identifying the capabilities of the first user terminal to reduce interference comprises identifying directional transmission capabilities of the first user terminal, and wherein scheduling the transmissions comprises scheduling uplink transmissions of the second user terminal to the second base station based at least in part on the directional transmission capabilities of the first user terminal.

5. The method according to claim 1, wherein reporting the capabilities comprises receiving, by the second base station, a notification from the first base station that indicates the interference capabilities of the first base station or of the first user terminal to reduce interference, by direct communication between the first base station and the second base station.

6. The method according to claim 1, wherein identifying the capabilities of the first user terminal to reduce interference comprises identifying interference cancellation capabilities of the first user terminal, and wherein scheduling the transmissions comprises scheduling sidelink transmissions of the second user terminal that communicates peer-to-peer with another user terminal based at least in part on the interference cancellation capabilities of the first user terminal.

7. The method according to claim 1, wherein identifying the capabilities of the first base station or of the first user terminal to reduce interference comprises identifying that at least one of the first base station and the first user terminal supports interference mitigation, and wherein scheduling the transmissions comprises scheduling the transmissions of the second base station to the second user terminal or transmissions of the second user terminal to the second base station, independently of scheduling transmissions of the at least one of the first base station and the first user terminal.

8. The method according to claim 1, wherein identifying the capabilities of the first user terminal to reduce interference comprises identifying a number of multiple-input multiple-output (MIMO) layers supported by the first user terminal, and inferring a number of receiving antennas of the first user terminal based on the number of MIMO layers supported.

9. The method according to claim 1, wherein identifying the capabilities of the first user terminal to reduce interference comprises detecting the first user terminal, which is served by the first base station and is likely to suffer from interference caused by the second base station, and identifying interference mitigation capabilities of the detected first user terminal.

10. The method according to claim 9, wherein detecting the first user terminal comprises receiving channel state information (CSI) from the first user terminal including channel quality expected under interference caused by downlink transmissions in neighbor cells, and detecting the first user terminal based on the received CSI.

11. The method according to claim 9, wherein detecting the first user terminal comprises accepting first power measurements of downlink transmissions of the first base station serving the first user terminal, further accepting second power measurements of interfering downlink transmissions in neighbor cells and received by the first user terminal, and detecting the first user terminal based on the first and second power measurements.

12. The method according to claim 9, wherein detecting the first user terminal comprises conducting in the second base station first power measurements of uplink transmissions of one or more user terminals served by the second base station, further conducting in the second base station second power measurements of uplink transmissions of the first user terminal, and detecting the first user terminal based on the first and second power measurements.

13. The method according to claim 1, wherein scheduling the transmissions of the second base station to the second user terminal or transmissions of the second user terminal to the second base station comprises setting at least one transmission attribute selected from a list consisting of a time interval used for transmission, a frequency allocated for transmission, and a spatial pattern of the transmission gain.

14. Apparatus, comprising:
  first and second base stations, which are configured to serve respective first and second user terminals in a cellular communication network; and
  a processor, which is located in a node of the cellular communication network, selected from a group of nodes consisting of the first base station, the second base station and a Radio Network Controller (RNC), and is configured to:
    identify (i) capabilities of the first base station to reduce interference caused to the first base station by transmissions of the second base station or by transmissions of the second user terminal, or (ii) capabilities of the first user terminal to reduce interference caused to the first user terminal by transmissions of the second base station or by transmissions of the second user terminal;
    report to the second base station the capabilities of the first base station or of the first user terminal to reduce the interference; and
    schedule transmissions (i) of the second user terminal to the second base station, or (ii) of the second base station to the second user terminal, based on the reported capabilities of the first base station or of the first user terminal to reduce the interference,
  wherein the processor is configured to schedule the transmissions by checking, based on the reported capabilities, whether or not the first user terminal is capable of directional transmission,
  wherein if the checking indicates that the first user terminal is capable of directional transmission, the processor is configured to reuse time/frequency resources that are allocated for uplink transmissions of the first user terminal in uplink transmissions of the second user terminal, and if the checking indicates that the first user terminal is incapable of directional transmission, the processor is configured to refrain from reusing time/frequency resources that are allocated for uplink transmissions of the first user terminal in uplink transmissions of the second user terminal.

15. The apparatus according to claim 14, wherein the processor is configured to identify interference cancellation capabilities of the first user terminal, and to schedule downlink transmissions of the second base station to the second user terminal based at least in part on the interference cancellation capabilities of the first user terminal.

16. The apparatus according to claim 14, wherein processor is configured to identify interference cancellation capabilities of the first base station, and to schedule uplink transmissions of the second user terminal based at least in part on the interference cancellation capabilities of the first base station.

17. The apparatus according to claim 14, wherein the processor is configured to identify directional transmission capabilities of the first user terminal, and to schedule uplink transmissions of the second user terminal to the second base station based at least in part on the directional transmission capabilities of the first user terminal.

18. The apparatus according to claim 14, wherein the processor is configured to identify interference cancellation capabilities of the first user terminal, and to schedule sidelink transmissions of the second user terminal that communicates peer-to-peer with another user terminal based at least in part on the interference cancellation capabilities of the first user terminal.

19. The apparatus according to claim 14, wherein the processor is configured to identify that the first base station or the first user terminal supports interference mitigation, and to schedule the transmissions of the second base station to the second user terminal or transmission of the second user terminal to the second base station independently of scheduling transmissions of the first base station of the first user terminal.

20. The apparatus according to claim 14, wherein the processor is configured to detect the first user terminal, which is served by the first base station and is likely to suffer from interference caused by the second base station, and to identify interference mitigation capabilities of the detected first user terminal.

* * * * *